(12) United States Patent
Wissner et al.

(10) Patent No.: US 10,013,463 B2
(45) Date of Patent: Jul. 3, 2018

(54) GENERATING A FEED OF CONTENT ITEMS ASSOCIATED WITH A TOPIC FROM MULTIPLE CONTENT SOURCES

(71) Applicant: Facebook, Inc., Menlo Park, CA (US)

(72) Inventors: James Matthew Wissner, Chelsea, MI (US); Robert James Morgan, San Rafael, CA (US)

(73) Assignee: Facebook, Inc., Menlo Park, CA (US)

( * ) Notice: Subject to any disclaimer, the term of this patent is extended or adjusted under 35 U.S.C. 154(b) by 209 days.

(21) Appl. No.: 14/298,803

(22) Filed: Jun. 6, 2014

(65) Prior Publication Data

US 2014/0365507 A1 Dec. 11, 2014

Related U.S. Application Data (60) Provisional application No. 61/831,728, filed on Jun. 6, 2013.

(51) Int. Cl.
*G06F 17/30* (2006.01)

(52) U.S. Cl.
CPC .... *G06F 17/3053* (2013.01); *G06F 17/30893* (2013.01)

(58) Field of Classification Search
None
See application file for complete search history.

(56) References Cited

U.S. PATENT DOCUMENTS

| | | | |
|---|---|---|---|
| 2008/0133245 A1 | 6/2008 | Proulx et al. | |
| 2010/0107254 A1* | 4/2010 | Eiland | H04L 63/1416 726/23 |
| 2011/0179020 A1* | 7/2011 | Ozzie | G06F 17/3089 707/723 |
| 2012/0005224 A1 | 1/2012 | Ahrens et al. | |
| 2012/0271829 A1 | 10/2012 | Jason | |
| 2012/0278329 A1* | 11/2012 | Borggaard | G06F 17/30699 707/738 |
| 2013/0007133 A1 | 1/2013 | Zuckerberg et al. | |
| 2013/0018896 A1* | 1/2013 | Fleischman | G06Q 50/01 707/748 |
| 2013/0036117 A1 | 2/2013 | Fisher et al. | |
| 2013/0054699 A1* | 2/2013 | Macaskill | G06Q 50/01 709/204 |
| 2013/0304822 A1* | 11/2013 | Tetreault | H04N 21/2187 709/204 |

(Continued)

OTHER PUBLICATIONS

PCT International Search Report and Written Opinion, PCT Application No. PCT/US2014/041427, dated Oct. 29, 2014, thirteen pages.

(Continued)

*Primary Examiner* — Alex N Gofman
*Assistant Examiner* — Muhammad U Mian
(74) *Attorney, Agent, or Firm* — Fenwick & West LLP (57) ABSTRACT

A newsfeed generation system generates feeds of content items related to specific topics. The newsfeed generation system receives content items from one or more content sources, and matches the content items to topics based on a measure of affinity of each content item for one or more objects in a database that are associated with various topics. Content items associated with an object associated with a topic are included in a feed of content items associated with the topic.

20 Claims, 9 Drawing Sheets

(56) References Cited

U.S. PATENT DOCUMENTS

| | | | | |
|---|---|---|---|---|
| 2013/0318156 A1* | 11/2013 | Friedman | ............ | H04L 29/06047 |
| | | | | 709/203 |
| 2013/0346401 A1* | 12/2013 | Karidi | ............... | G06F 17/30867 |
| | | | | 707/723 |
| 2014/0040370 A1* | 2/2014 | Buhr | ..................... | H04L 67/306 |
| | | | | 709/204 |
| 2014/0079297 A1* | 3/2014 | Tadayon | .................. | G06K 9/00 |
| | | | | 382/118 |
| 2014/0195534 A1* | 7/2014 | Diament | ........... | G06F 17/30705 |
| | | | | 707/737 |
| 2014/0330760 A1* | 11/2014 | Meier | ................ | G06F 17/3089 |
| | | | | 706/12 |

OTHER PUBLICATIONS

Canadian Intellectual Property Office, Office Action, Canadian Patent Application No. 2,913,283, dated Nov. 30, 2016, three pages.

\* cited by examiner

GENERATING A FEED OF CONTENT ITEMS ASSOCIATED WITH A TOPIC FROM MULTIPLE CONTENT SOURCES

CROSS REFERENCE TO RELATED APPLICATIONS

This application claims the benefit of U.S. Provisional Patent Application No. 61/831,728, filed Jun. 6, 2013, which is incorporated by reference in its entirety.

BACKGROUND

This disclosure relates generally to generating a feed of content items in an online system, and in particular to generating topical feeds.

Numerous online platforms provide their users with the ability to create, find, and share content related to any number of topics. The rate and growth of content being published is increasing rapidly, especially in real-time social networking platforms. However, existing online platforms do not cohesively surface real-time data or apply substantive quality filters to created content. Thus, users of conventional online platforms who desire receive or to follow content associated with specific topics are unable to easily identify content associated with the specific topics, and often navigate through large amounts of content to identify content associated with the specific topics. As the amount of content provided by online platforms increases, it becomes increasingly more difficult for users to follow topics of interest and find high-quality information relevant to the topics of interest.

SUMMARY

A newsfeed generation system, or other online system, generates feeds of content items related to particular topics. Content items are received from a variety of content sources by the newsfeed generation system, which determines measures of affinity between various content items and objects in a database. Each object in the database is associated with one or more topics. The newsfeed generation system associates a content item with one or more objects based on the measures of affinity of the content item for various objects. For example, a content item is associated with an object for which the content item has a maximum measure of affinity or is associated with one or more objects for which the content item has at least a threshold measure of affinity. In various embodiments, the newsfeed generation system determines measures of affinity between a content item and various objects using match keys extracted from the content item, grammatical structure of the content item, or metadata of the content item (e.g., author, time created, and geographic location). The newsfeed generation system may associate a content item with one or more objects based on an ontology that specifies relationships between the objects. An ontology may be associated with a topic and specify relationships between various objects associated with the topic. In one example, the newsfeed generation system maintains a database of objects associated with a sports ontology defining relationships between such objects as teams, athletes, and coaches.

A feed including content items associated with a topic is generated based on content items associated with at least one object associated with the topic. In various embodiments, the feed includes content items having at least a threshold measure of affinity for at least one object associated with the topic. The feed associated with the topic is communicated to a user, allowing the user to readily identify content items associated with the topic.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
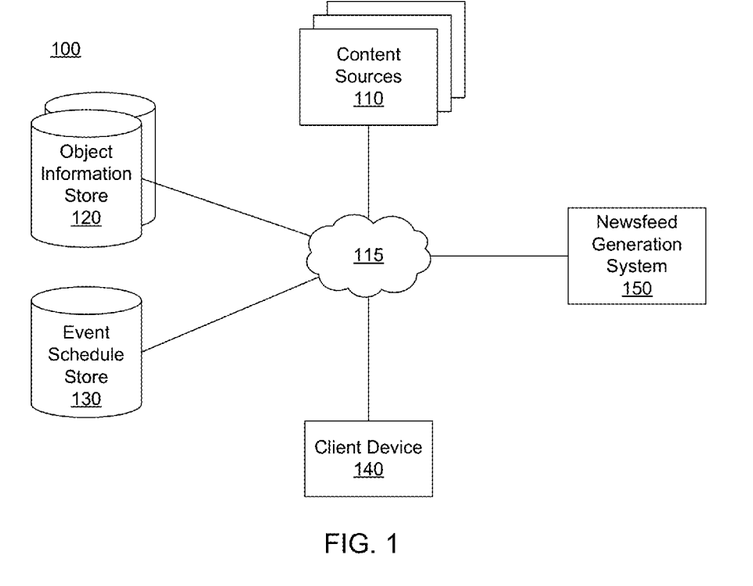
FIG. 1 is a block diagram of a system environment in which a newsfeed generation system operates, according to one embodiment.

FIG. 1 is a high level block diagram of a system environment 100 for a newsfeed generation system 150. The system environment 100 shown by FIG. 1 comprises one or more content sources 110, one or more object information stores 120, an event schedule store 130, one or more client devices 140, a network 115, and the newsfeed generation system 150. In alternative configurations, different and/or additional components may be included in the system environment 100.

The content sources 110 provide feeds of content items and may include any of a variety of systems for managing real-time content creation. Examples of content sources 110 include social networking systems, news websites, rich site summary (RSS) feeds, and the like. Authors provide content items to a content source 110, which publishes the content items to various users of the content source 110. Various types of content items may be provided by a content source 110 to users. Example types of content items include social networking posts, check-ins to a location, news updates, blog entries, image data, audio data, and video data. Users of a content source 110 view and interact with content items published by the content source 110. Content items published via a content source 110 may be publically available to any user of the content source 110 or may be available to a subset of the users of the content source 110. For example, an author's content items published by a social networking system are visible to users connected to the author via the social networking system, but are not visible to users that are not connected to the author via the social networking system. Furthermore, the content sources 110 may provide external systems with access to the content items by application programming interfaces (APIs) or any other suitable method. A content source 110 may also enable users to interact with content items posted by other users, such as indicating a preference for a content item (i.e., "liking" the content item) or sharing a content item with additional users of the content source 110 or with a user of an additional content source 110.

An object information store 120 stores objects and information related to the objects. In various embodiments, the object information stores 120 are maintained by the content sources 110, by the newsfeed generation system 150, or by one or more systems external to the content sources 110 and external to the newsfeed generation system 150 that provide API access to the object information stores 120. In one example, an object information store 120 stores sports-related objects, such as names of sports teams, athletes, coaches, and commentators. The object information stores 120 may also store other information about the objects. In the preceding example storing sports-related objects, the object information store 120 stores information about the teams, including athletes and coaches of each team, a city with which each team is associated, and a name of each team's home venue.

The event schedule store 130 stores one or more schedules of events associated with objects in one or more of the object information stores 120. For example, if an object information store 120 includes sports-related objects, the event schedule store 130 includes one or more schedules of sporting events involving the objects. In this case, schedules in the event schedule store 130 provide dates and times of athletic events, teams and/or athletes competing in each event, and the location of each event. The event schedule store 130 may be separate from the object information stores 120, or may be included in one or more of the object information stores 120.

The client devices 140 are one or more computing devices capable of receiving user input as well as transmitting and/or receiving data via the network 115. In one embodiment, a client device 140 is a conventional computer system, such as a desktop or a laptop computer. Alternatively, a client device 140 may be a device having computer functionality, such as a personal digital assistant (PDA), a mobile telephone, a smartphone or another suitable device. A client device 140 is configured to communicate via the network 115. In one embodiment, a client device 140 executes an application allowing a user of the client device 140 to interact with the content sources 110 and the newsfeed generation system 150. For example, a client device 110 executes a browser application to enable interaction between the client device 140 and the newsfeed generation system 150 via the network 115. In another embodiment, a client device 140 interacts with the newsfeed generation system 150 through an application programming interface (API) running on a native operating system of the client device 140, such as IOS® or ANDROID™.

The newsfeed generation system 150 receives content items from one or more content sources 110 and generates feeds of content items associated with particular topics. For example, each feed includes content items associated with a specific topic obtained from one or more content sources 110. In one embodiment, the newsfeed generation system 150 retrieves information from the object information stores 120 to populate an object store with objects associated with one or more ontologies. An ontology in the newsfeed generation system 150 defines roles and relationships of entities in a given domain. Objects in the newsfeed generation system 150 are particular instances of the entities in the ontology. For example, a sports ontology defines relationships between entities such as discipline, league, team, athlete, and coach. Example objects within the sports ontology include football (an instance of the discipline entity), the National Football League (an instance of the league entity), the San Francisco 49ers (an instance of the team entity), Colin Kaepernick (an instance of the athlete entity), and Jim Harbaugh (an instance of the coach entity). The newsfeed generation system 150 associates Colin Kaepernick and Jim Harbaugh with the San Francisco 49ers based on the relationships between athletes, coaches, and teams defined by the sports ontology.

To generate feeds from content items received form content sources 110, the newsfeed generation system 150 matches content items received from the content sources 110 to objects maintained by one or more object stores 120. Each feed includes content items matched to a topic, which may be an object, a group of objects, an event related to an object, or the like. In some embodiments, the newsfeed generation system 150 generates a feed including content items associated with a topic in response to receiving a user query for the topic or in response to a user selection of the topic. In one embodiment, the newsfeed generation system 150 provides the feed to the client devices 140 via a customized portal. In other cases, the newsfeed generation system 150 supplies the feed to another system, such as one of the content sources 110.

The client device 140, content sources 110, and newsfeed generation system 150 are configured to communicate via the network 115, which may comprise any combination of local area and/or wide area networks, using both wired and/or wireless communication systems. In one embodiment, the network 115 uses standard communications technologies and/or protocols. For example, the network 115 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 115 may be encrypted using any suitable technique or techniques.

Figure 2:
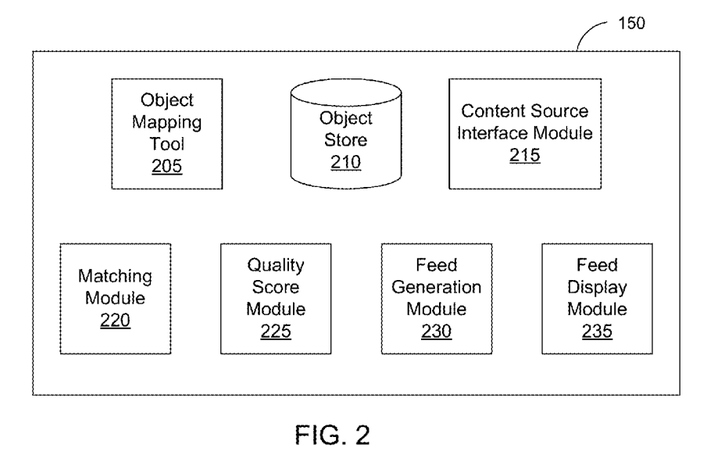
FIG. 2 is a block diagram of a newsfeed generation system, according to one embodiment.

FIG. 2 is a block diagram of an architecture of the newsfeed generation system 150. The newsfeed generation system 150 shown in FIG. 2 includes an object mapping tool 205, an object store 210, a content source interface module 215, a matching module 220, a quality score module 225, a feed generation module 230, and a feed display module 235. In other embodiments, the newsfeed generation system 150 may include additional, fewer, or different components for various applications. Conventional components such as network interfaces, security functions, load balancers, failover servers, management and network operations consoles, and the like are not shown so as to not obscure the details of the system architecture.

The object mapping tool 205 retrieves information from one or more object information stores 120 and populates the object store 210 using the retrieved information. In various embodiments, the object mapping tool 205 maps information from one or more object information stores 120 to objects in the object store 210 according to an ontology. For example, to populate the object store 210 with objects associated with a sports ontology, the object mapping tool 205 retrieves lists of teams and team rosters from one or more object information stores 120 and creates a record for each object, where an object record includes information associated with an object (e.g., match keys for identifying the object, characteristics of content items associated with the object, types of content items associated with the object). The object records may be associated with other object records according to the ontology. For example, the object mapping tool 205 creates an association between an object record for an athlete and an object record for the athlete's team.

In one embodiment, the object mapping tool 205 maps other information retrieved from the object information stores 120 to the records created for the objects. For example, the object mapping tool 205 adds identifying information about an athlete, including nicknames of the athlete and hashtags identifying the athlete, to the athlete's record in the object store 210. As another example, the object mapping tool 205 adds identifying information about a team, such as the team's nicknames, home stadium, and city affiliation, to the team's record in the object store 210. In some cases, the information added to an object's record by the object mapping tool 205 is stored as a positive or negative match key associated with the object. A positive match key is a term or phrase that can be used to identify an object. For example, positive match keys associated with an athletic team may include the name of the team, abbreviations of the name, nicknames, and the city affiliation of the team. A negative match key is a term or phrase that does not identify the object. Negative match keys associated with an athletic team may include names of teams or other objects that are similar to the team's name that should not be used to identify the team.

In one embodiment, the object mapping tool 205 provides an interface to a human editor for modifying object records in the object store 210. Using the interface, a human editor may create or edit relationships between object records, augment object records with other information about the objects (such as athlete or team nicknames), add or remove match keys, define or modify affinities between objects, or complete other actions related to the object records.

Figure 6:
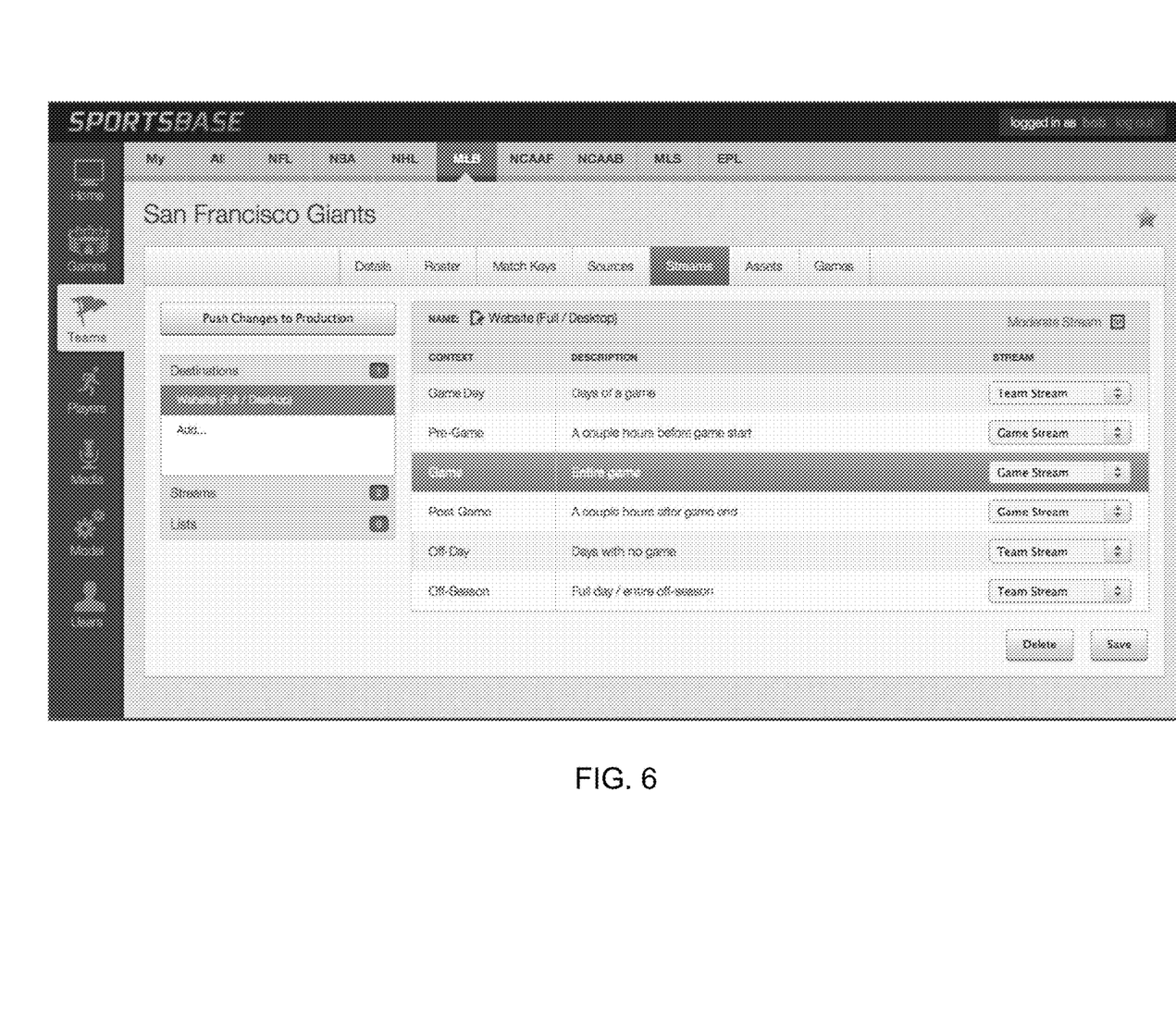
FIG. 6 is an example user interface identifying types of streams associated with an athletic team object record.
Figure 7:
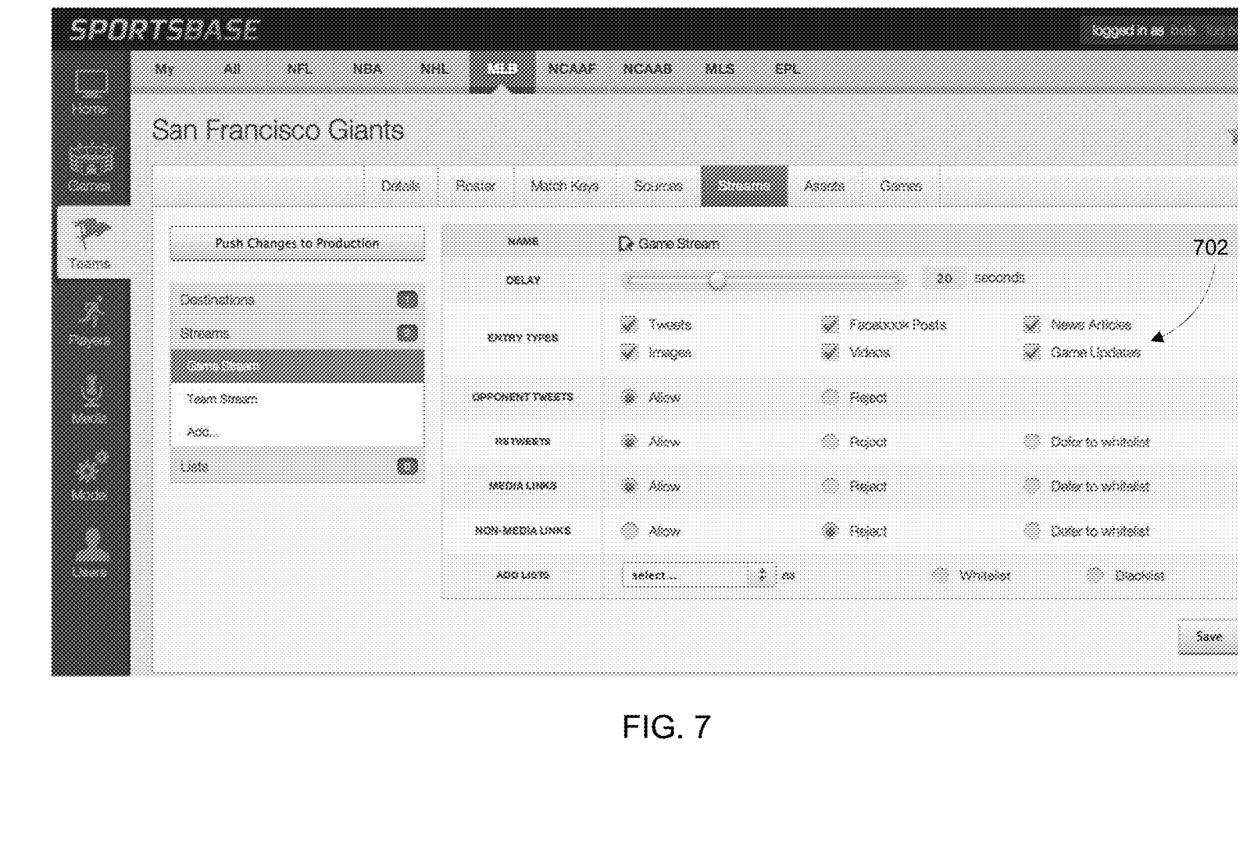
FIG. 7 is an example user interface illustrating customization of a feed of content items related to an athletic team.
Figure 8:
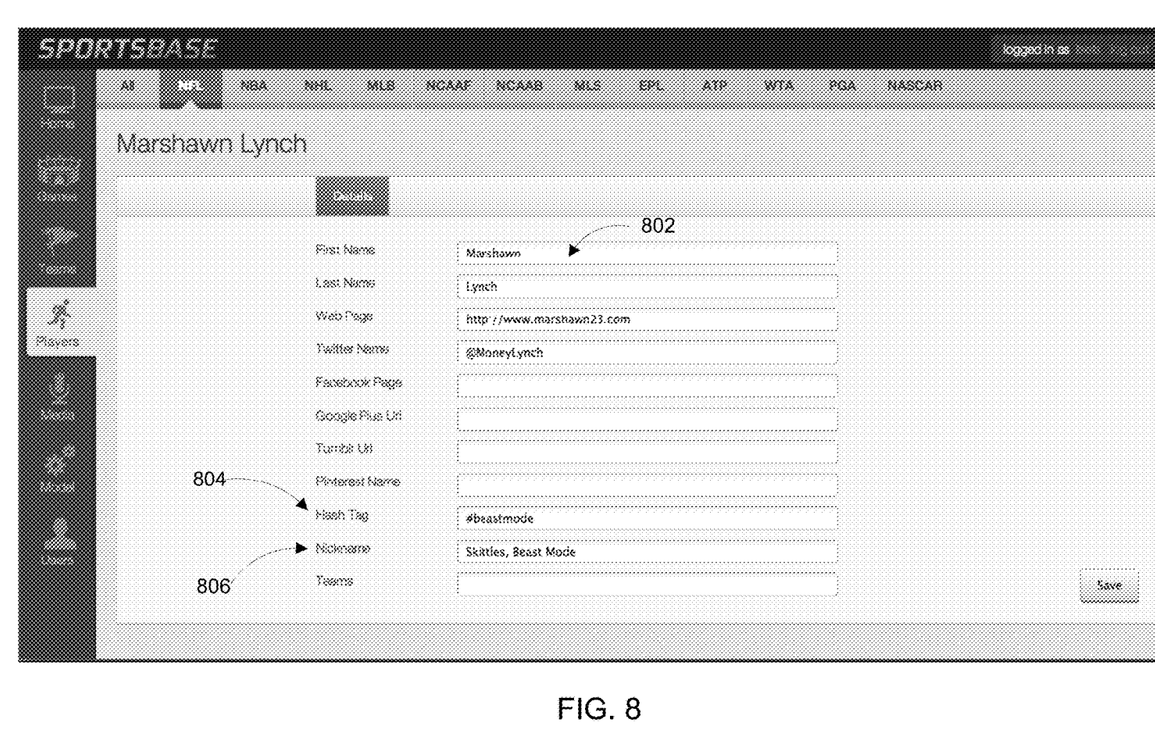
FIG. 8 is an example user interface illustrating an athlete record.

FIGS. 3-8 illustrate example user interfaces displaying information from object records in the object store 210, according to one embodiment. FIGS. 3-7 illustrate an object record for the San Francisco Giants baseball team. FIG. 8 illustrates an object record for the athlete Marshawn Lynch.

Figure 3:
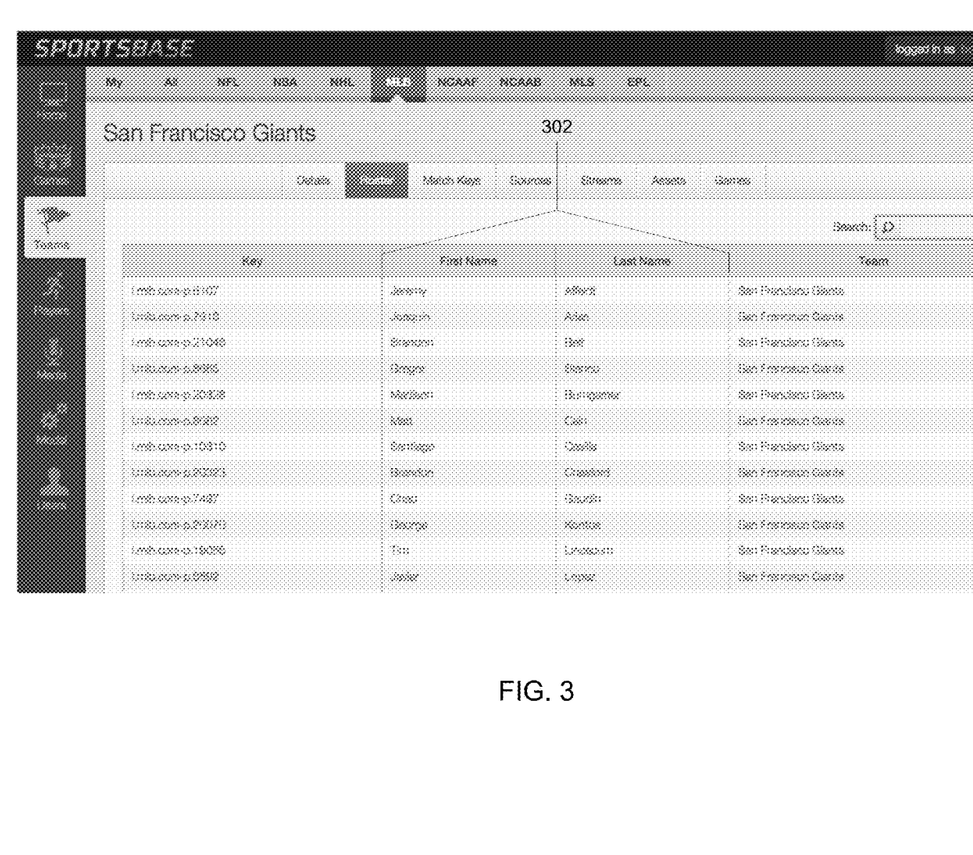
FIG. 3 is an example user interface displaying an athletic team object record.

As shown in FIG. 3, the San Francisco Giants team object is associated with a number of athletes 302, with each athlete corresponding to an object retrieved from an object information store 102, and relationships between the athletes and the team object defined by a sports ontology. The list of athletes 302 correspond to objects retrieved from one or more object information stores 120 and mapped to the San Francisco Giants team object by the object mapping tool 205. Additionally, the team object associates a key with each object associated with the team object to simplify subsequent retrieval of various objects.

Figure 4:
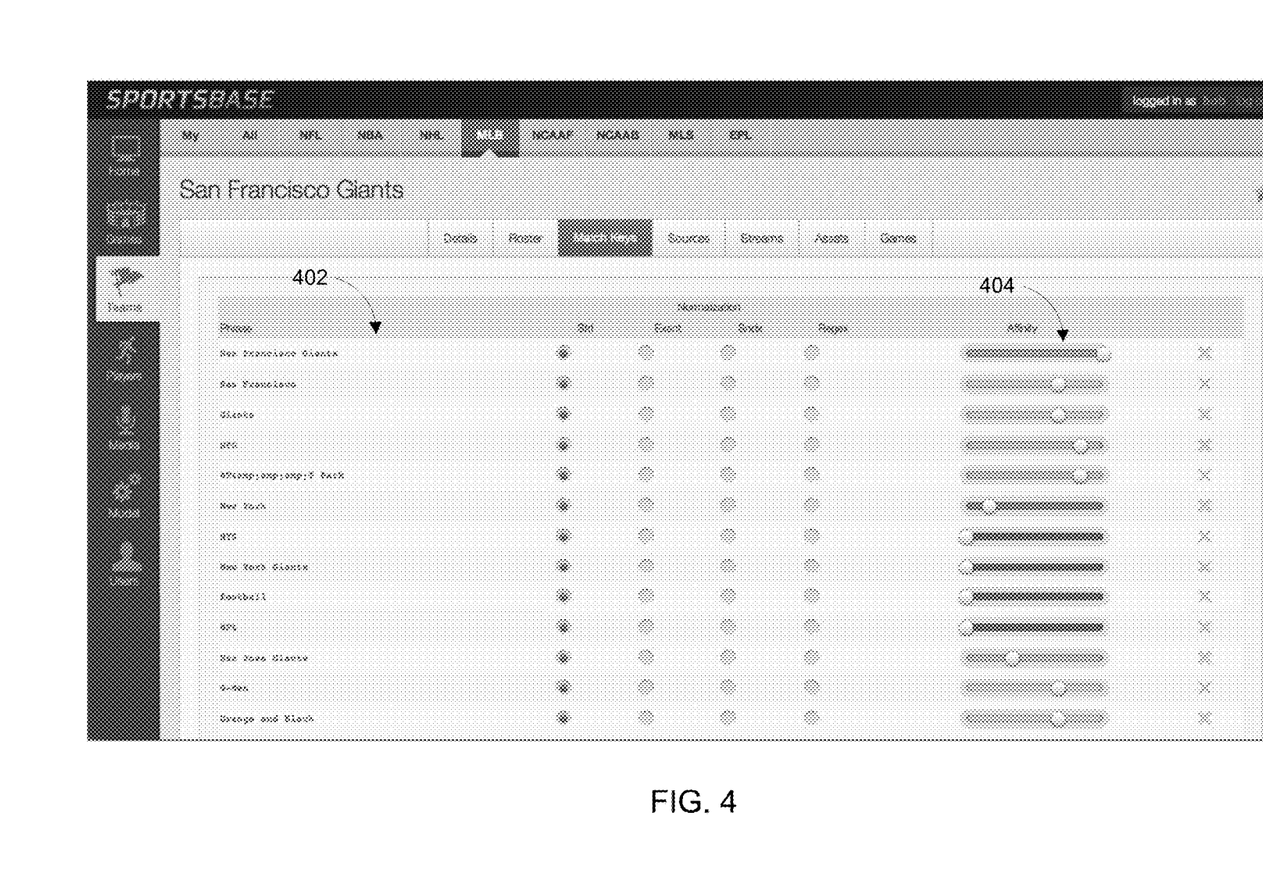
FIG. 4 is an example user interface identifying match keys associated with an athletic team object record.

FIG. 4 illustrates example match keys 402 of the San Francisco Giants team object and affinities 404 of each match key to the object. The affinity of a match key for an object represents a likelihood of the object being associated with a content item including the match key. In the example illustrated in FIG. 4, the affinities 404 are adjustable from highly negative values (at the left side of each slider bar) to highly positive values (at the right side of each slider bar). For example, the phrase "San Francisco Giants" has a high positive affinity to the San Francisco Giants team object, so it is highly likely that a content item including the phrase is referencing the team object. As another example, the phrase "New York Giants" has a high negative affinity to the San Francisco Giants team object, so it is highly unlikely that a content item using the phrase is referencing the team object. In one embodiment, an editor may manually adjust the affinity of each match key to the object or add or remove match keys from the object record using the interface shown in FIG. 4.

Figure 5:
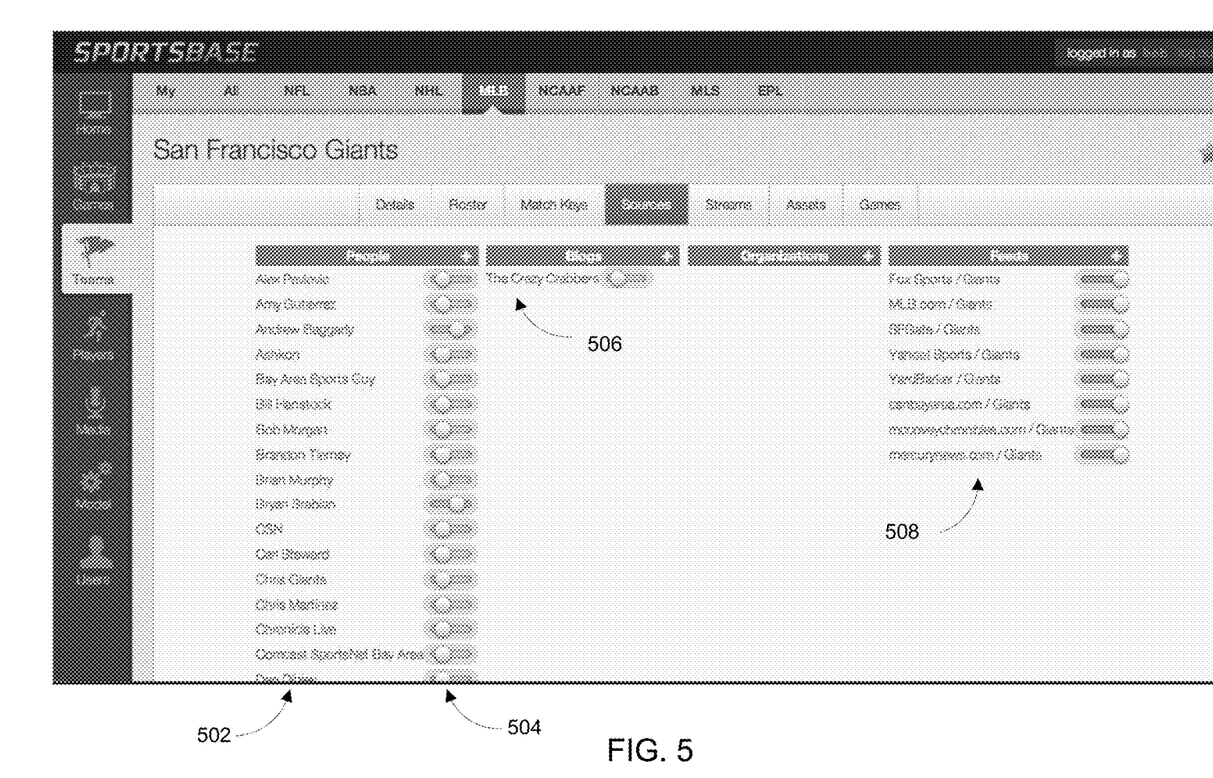
FIG. 5 is an example user interface identifying authors and content sources associated with an athletic team object record.

FIG. 5 illustrates an example interface for identifying sources of content items associated with the San Francisco Giants team object. In the example shown by FIG. 5, authors 502 associated with the San Francisco Giants team object. Each author or authoring entity associated with content items has an affinity 504 to the team object, which may be adjustable by a user in some embodiments. As shown in FIG. 5, the object record for an object may also identify content sources 506 or particular feeds 508 from content sources that are associated with the object, as well as specify an affinity of content from each identified content source 506 or feed 508 from a content source with a corresponding affinity to the object. In one embodiment, an editor may adjust the affinity of each author 502, content source 506, or feed 508 or may add or remove authors 502, content sources 506, or feeds 508 from the object record using the interface shown in FIG. 5.

As shown in FIG. 6, an object record may describe presentation of content items associated with the object through specified types of streams associated with the San Francisco Giants team object, with a stream describing presentation of content items associated with the object. In the example shown in FIG. 6, content items associated with the object may be added to a team stream (a feed of content items related to the baseball team) or to a game stream (a feed of content items related to a game the team is playing). Using the interface shown in FIG. 6, an editor may specify a stream to which content items are added in various contexts, including the day of a game, a few hours before the start of a game, during a game, a few hours after the end of the game, days with no games, and the off-season. By associating different types of streams with the object in different contexts, the format in which content items are presented is modified based on the context to increase the likelihood of user interaction with various content items. In one embodiment, the streams may also be selected by a user viewing the content items associated with the object. For example, a user subscribed to the San Francisco Giants team stream may select contexts in which content items are presented in a team stream format.

FIG. 7 illustrates an example user interface enabling a user to customize a feed including content items related to the San Francisco Giants topic. For example, the user selects types 702 of content items to include in the feed. In some cases, the user interface is displayed to an administrative editor who edits the properties of the object for any users who receive the feed related to the topic. In other cases, the user interface is displayed to a user receiving the topical feed, allowing the user to customize his feed.

FIG. 8 illustrates a user interface for an example object record for the athlete Marshawn Lynch. As shown in FIG. 8, an object record for an athlete object may include the athlete's name 802, hashtags 804 identifying the athlete, and nicknames 806 of the athlete. Content items including the athlete's name 802, one or more of the hashtags 804, or one or more of the nicknames 806 are subsequently associated with the athlete object record. In one embodiment, an editor may edit the athlete record using the interface shown in FIG. 8 to, for example, add or remove hashtags or nicknames associated with the athlete. This allows the editor to modify content items associated with the athlete.

Returning to FIG. 2, the content source interface module 215 retrieves content items from various content sources 110. In some embodiments, feeds of multiple content items are retrieved from various content sources 110. For each content item, the content source interface module 215 retrieves textual content, images, or videos, as well as metadata such as author and time the content item was created. In some embodiments, the content source interface module 215 may also retrieve a location associated with various content items, such as a location where a content item was created (e.g., geotagging information or an IP address of a client device 140 from which an author generated the content item). In one embodiment, the content source interface module 215 retrieves the content items by accessing a public API of the content sources 110.

The matching module 220 matches the content items received from the content sources 110 to topics. In some embodiments, a topic is an object in the object store 210. For example, the matching module 220 matches content items to a topic relating to a particular object in the object store 210 (e.g., an object corresponding to an athlete). In other embodiments, a topic is associated with a set of objects in the object store 210. For example, the matching module 220 matches content items to an athletic team, which is associated with a team object in the object store 210, and matches content items to objects associates with athletes on the team. In still other embodiments, a topic is an event associated with one or more objects. For example, the matching module 220 matches content items to a particular athletic event (such as a game between two teams), which is associated with two teams having objects in an object store 210 and athletes who are members of each team and associated with objects in one or more object stores 210 for a particular period of time.

To match content items retrieved from the content sources 110 to topics, the matching module 220 determines an affinity of the content items to various objects or sets of objects in the object store 210, which are each associated with one or more topics. The matching module 220 determines a measure of affinity of a content item for multiple objects maintained by the object store 210 and associates the content item with an object based on the measures of affinity. For example, the content item is associated with an object for which the content item has a maximum measure of affinity, associating the content item with one or more topics associated with the object with which the content item has the maximum measure of affinity. The matching module 220 may determine a measure of affinity between a content item and each object stored in the object store 210.

In one embodiment, the matching module 220 selects candidate objects from the object store 210 for comparison to a content item. When a content item is received from a content source 110, the matching module 220 tokenizes the text of the content item into a set of discrete terms or phrases. The matching module 220 then selects candidate objects from the object store 210 by comparing the tokens and with content in object records included in the object store 210 and associated with various objects. For example, the matching module 220 selects objects associated with object records having content matching one or more tokens extracted from the content item as candidate objects. The matching module 220 then determines measures of affinity between the content item and each of the candidate objects.

To determine a measure of affinity between a content item and an object, the matching module 220 determines an affinity of one or more match keys extracted from the content item to content associated with the object. For example, the matching module 220 determines an affinity value with various match keys extracted from a content item and associated with an object based on affinities between the match keys and objects stored in the object store 210. In this case, the matching module 220 extracts data (e.g., text data) from the content item, identifies match keys in the object store 210 having at least a threshold measure of similarity to the extracted data, identifies an object associated with each identified match key, and retrieves affinity values associated with match keys that are associated with identified objects. If the content item includes data having at least the threshold measure of similarity to a single match key, the matching module 220 may determine the measures of affinity between the content item and objects in the object store 210 as the affinity value between the match key and various objects. If content extracted from a content item has at least the threshold measure of similarity to multiple match keys associated with an object, the matching module 220 determines the measure of affinity between the content item and the object based on a function combining the affinity values of each match key associated with the object that have at least a threshold measure of similarity to content extract from the content item. For example, the matching module 220 determines a measure of affinity between a content item and an object as a weighted average of affinity values associated with various match keys associated with the object.

In one embodiment, the matching module 220 analyzes a grammatical structure of text in a content item to determine a measure of affinity between the content item and an object. Rather than analyzing individual terms included in the content items, the matching module 220 matches a content item to one or more objects in the object store 210 based on sentence structure of text data in the content item. For example, the matching module 220 compares text data in a content item to a set of grammatical templates, where each grammatical template includes variables for objects in the object store 210 having various types. Example grammatical templates include "<city> <team name>," "<athlete1> bailed out <athlete2>," and "<athlete1> just threw down <athlete2>," where each city, team name, and athlete variable may have a value of any object having a type specified by the variable. The grammatical templates may be associated with particular ontologies or particular entities within an ontology. For example, a grammatical template applicable to basketball may be different than a grammatical template applicable to football, so different grammatical templates are associated with ontologies for entities associated with football and ontologies for entities associated with basketball. The grammatical templates may be learned over time by the newsfeed generation system 150 based on analysis of content items received over time. In other embodiments, a user of the newsfeed generation system 150 defines grammatical templates associated with particular topics or with a particular ontology.

The matching module 220 uses the grammatical templates to determine a measure of affinity between the content item and an object. For example, several content items may include the match keys "Detroit" and "lions," some discussing the Detroit Lions football team and others discussing lions at a zoo in Detroit. The matching module 220 compares these content items to the grammatical templates, and determines that the content items discussing the Detroit Lions football team match a grammatical template having a "<city> <teamName>" structure while the content items describing lions at the Detroit zoo do not match the grammatical template. Accordingly, the content items discussing the Detroit Lions are determined to have higher measures of affinity to a topic associated with football than the measures of affinity for the topic associated with football by content items about lions at the zoo.

Additionally, the matching module 220 may also use metadata associated with a content item to determine measures of affinity between the content item and various objects in the object store 210. In one embodiment, the matching module 220 determines a measure of affinity of the author of a content item to each object in a set of objects in the object store 210. For example, if a content item's author frequently writes about a particular sports team, an affinity value between the author and the sports team is high. In another embodiment, the matching module 220 determines an affinity of the source 110 of the content item to each of a set of objects in the object store 210. For example, a news website affiliated with a particular city may be more likely to write about the city's athletic teams than a news website affiliated with a different city, so thus a city's news website may have a high affinity to the city's athletic teams. The affinity between an author or content source 110 and an object may be stored in the object store 210 in an object record associated with the object.

The matching module 220 uses the match keys, grammatical structure, and/or author or content source affiliation to determine a baseline measure of affinity between a content item and various objects. In one embodiment, the matching module 220 increases or decreases the baseline measure of affinity based on other metadata of the content item. For example, if an object in the object store 210 is associated with an event, one embodiment of the matching module 220 accounts for a time when a content item was created relative to a time associated with the event to determine a measure of affinity between the content item and the object associated with the event. The matching module 220 compares the time the content item was created to a schedule of events associated with one or more objects and increases the measure of affinity between the content item and an object associated with an event from the baseline measure of affinity if the content item was generated during a time window corresponding to the event (e.g., during the event, less than a threshold amount of time before the event, or less than a threshold amount of time after the event) or decreases the measure of affinity from the baseline measure of affinity if the content item was generated outside the time window corresponding to the event.

As another example, the matching module 220 modifies a measure of affinity between a content item and an object based on a location associated with the content item, such as a location where the content item was created. The matching module 220 compares the content item's location to locations associated with objects in the object store 210, such as locations associated with events associated with objects in the object store 210. For example, a content item is geotagged as created at an athletic stadium. In this example, a measure of affinity between the content item and objects associated with the athletic stadium (e.g., teams playing at the stadium or athletes on the teams playing at the athletic stadium) is likely to be higher than the affinity between the content item and other objects. Accordingly, the matching module 220 increases the measure of affinity between the content item and objects associated with the stadium from a baseline measure of affinity.

The quality score module 225 generates a quality score for each content item received from a content source 110. A quality score associated with a content item represents a measure of a uniqueness of the content item, a social contribution of the author of the content item, or any other suitable characteristic associated with the content item. The quality score may provide a likelihood of a user interacting with the content item or of the user having an interest in the content item. For example, the quality score module 225 analyzes content items retrieved from the content sources 110 to identify repeated content items or repeated formats of content items. In this example, content items having a similar format, such as check-ins by users to locations, are flagged as repeated if at least a threshold number of content items have the similar format, so the quality score module 225 decreases the quality score content items having the similar format. Similarly, content items reposted by multiple users may receive lower quality scores than the originally-posted content item. As another example, if a content item was posted to a social networking system, the quality score module 225 retrieves an engagement score from the social networking system describing an amount of interaction by an author of the content item with the social networking system and accounts for the engagement score when generating a quality score for the content item. For example, content items associated with authors with at least a threshold engagement score with the social networking system receive higher quality scores than content items associated with authors having less than the threshold engagement score with the social networking system.

The feed generation module 230 generates a feed of content items each associated with a topic by selecting content items associated with one or more objects associated with the topic by the matching module 220. The selected content items are included in a feed associated with the topic, which may include content items received from from multiple content sources 110. In one embodiment, the feed generation module 230 identifies objects associated with a topic based on an ontology specifying relationships between various entities. Hence, if a content item matches an object identified by the ontology as related to an additional object, the content item may be included in a feed including content items associated with the additional object or with the object. For example, a sports ontology defines a relationship between a team and the team's athletes, so the feed generation module 230 generates a feed including content items associated with the team by selecting content items matched to the team object or matched to objects for the team's athletes.

In one embodiment, the feed generation module 230 selects a set of content items having at least a threshold measure of affinity for one or more objects associated with the topic. The threshold measure of affinity for selecting content items for inclusion in a feed associated with a topic may be adjusted based on a desired number of content items in the feed or a desired relevance of the content items. For example, a higher threshold measure of affinity filters out content items less likely to be relevant to a topic, while a lower threshold measure of affinity increases a number of content items included in the feed. In one embodiment, the feed generation module 230 sets the threshold measure of affinity based on a number of content items associated with a topic within a specified period of time. If the matching module 220 associates at least a threshold number of received content items with a topic, the feed generation module 230 increases a threshold measure of affinity for selecting content items to include in a feed associated with the topic. Conversely, if the matching module 220 associates less than a threshold number of content items with a topic, the feed generation module 230 decreases the threshold measure of affinity to increase the number of content items included in the feed associated with the topic.

Similarly, the feed generation module 230 may select content items to include in a feed associated with a topic based on quality scores associated with content items. For example, the feed generation module 230 filters out content items having less than a threshold quality score from inclusion in a feed associated with a topic. Thus, the feed generation module 230 may select content items for inclusion in a feed associated with a topic having both at least a threshold measure of affinity for an object associated with the topic and at least a threshold quality score. The threshold quality score may be modified based on a desired number of content items in the feed associated with the topic or a desired quality of the content items included in the feed associated with the feed.

The feed generation module 230 may also cluster similar content items in a feed associated with a topic. In one embodiment, the feed generation module 230 determines similar content items by comparing match keys extracted from various content items with each other or by comparing the text of various the content items with grammatical templates. If multiple content items include the same or similar match keys, or include text corresponding to the same or similar grammatical templates, the feed generation module 230 clusters the content items in the feed. For example, if several content items address the same play in an athletic event, the feed generation module 230 clusters the content items in the feed so the content items are presented adjacent to each other or are presented as an aggregated content item including content from multiple content items. Alternatively, the feed generation module 230 may select a subset of the content items representative of the cluster for inclusion in the feed and not include the other items in the cluster. For example, the feed generation module 230 selects content items having the highest quality scores or having at least a threshold quality score for inclusion in the feed.

The feed display module 235 provides a feed generated by the feed generation module 230 to a client device 140 for presentation to a user. One embodiment of the feed display module 235 provides a feed associated with a topic to an external system, such as one or more of the content sources 110, which provide the feed associated with the topic to the client device 140. Other embodiments of the feed display module 235 generate a user interface presenting the feed associated with the topic and provide the user interface to the client device 140. The user interface may include native links for interacting with the content items in the feed, such as indicating a preference for a content item, commenting on a content item, and sharing a content item with another user. Furthermore, the user interface may include an overview of the objects or events, statistical information, expert commentary, or any other information relevant to the topic associated with the feed.

Generating a Feed Associated with a Topic

Figure 9:
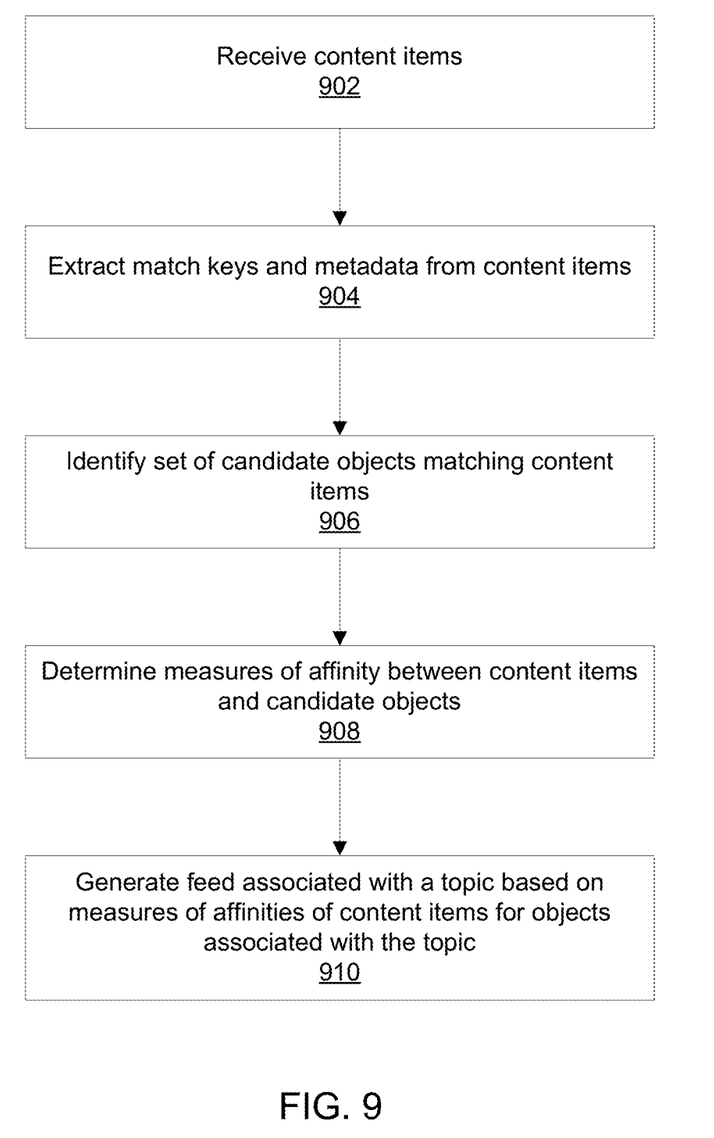
FIG. 9 is a flowchart illustrating a process for generating a feed of content items related to a topic, according to one embodiment.

FIG. 9 is a flowchart illustrating one embodiment of a process for generating a feed of content items related to a topic. In one embodiment, the steps of the process are performed by the newsfeed generation system 150. Other embodiments of the process include different, fewer, or additional steps, or may perform the steps in different orders.

The newsfeed generation system 150 receives 902 content items from one or more content sources 110, such as social networking systems, news outlets, or web sites. In some embodiments, the newsfeed generation system 150 receives 902 feeds that each include one or more content items from one or more content sources 110. The newsfeed generation system 150 extracts 904 match keys and metadata (such as author, location, and time) from each of the received content items. In one embodiment, the match keys and metadata are tokenized into a set of discrete terms or phrases.

The newsfeed generation system 150 uses the match keys and metadata 904 from each content item to identify 906 a set of candidate objects for comparison to the received content items. For example, if a content item includes the text "Athletics reinstate Brandon Moss," the newsfeed generation system 150 tokenizes the text into "Athletics," "reinstate," "Brandon," and "Moss" and compares the tokens to information associated with to objects in the object store 210. Objects from the object store 210 associated with at least a threshold amount of content matching, or similar to, the tokens are identified as candidate objects. In the preceding example, the candidate objects include objects associated with the Oakland Athletics baseball team, Brandon Moss, Brandon Phillips, Randy Moss, and other objects in the object store 210 matching at least a threshold number of the tokens.

Based on the match keys and metadata extracted 904 from each content item, the newsfeed generation system 150 determines 908 a measure of affinity of a content item to each of the candidate objects. In one embodiment, the newsfeed generation system 150 determines 908 a measure of affinity of the content item for various objects by analyzing affinities of the match keys and metadata to the objects. In particular, the newsfeed generation system 150 determines a baseline affinity measure between the content item and respective objects based on match keys extracted from the content items. For example, the object store 210 stores affinity values between match keys and objects, and the newsfeed generation system 150 determines a baseline measure of affinity between a content item and various objects based on the stored affinity values. The newsfeed generation system 150 may additionally or alternatively use metadata associated with a content item, such as an author or a content source 110 of the content item, to generate the baseline measure of affinity between the content item and various objects in the object store 210.

In one embodiment, the newsfeed generation system 150 adjusts the baseline measure of affinity measures based on other metadata of content items, such as a time when a content time was created or provided to a content source 110 or a location associated with a content item. For example, the newsfeed generation system 150 identifies an event associated with one or more objects (e.g., an athletic event associated with two teams and their respective athletes) and modifies a baseline measure of affinity between a content item and the one or more objects based on metadata associated with the content item and information associated with the event. For example, if the content item was posted during a time window corresponding to the event, the newsfeed generation system 150 increases the baseline measures of affinity between the content item and objects associated with the event; if the content item is posted outside of a time window corresponding to the event, the newsfeed generation system 150 may decrease the baseline measures of affinity between the content item and objects associated with the event.

Based on measures of affinity between content items and candidate objects, the newsfeed generation system 150 generates 910 a feed of content items related to a topic. In some embodiments, the feed is generated in response to the newsfeed generation system 150 receiving a user query for a topic. In other embodiments, a user subscribes to a feed related to a topic by entering a query or selecting topics from a list and subsequently receives the feed from the newsfeed generation system 150. Alternatively, a feed associated with a topic is automatically generated. For example, the newsfeed generation system 150 generates 910 a feed including content items associated with a current event, such as an athletic event or a news story. The feed may include content items customized to a particular user and associated with a topic, such as content items posted by the user's social network connections.

To generate 910 the feed including content items associated with a topic, the newsfeed generation system 150 selects content items having at least a threshold measure of affinity for one or more objects associated with the topic. The threshold measure of affinity may be a fixed value or may be adjustable by the user or by the newsfeed generation system 150. For example, the newsfeed generation system 150 modifies the threshold measure of affinity based on a number of content items matched to a topic associated with a feed in a given period of time. As the frequency of content items matched to the topic associated with the feed increases, the newsfeed generation system 150 may increase the threshold measure of affinity to reduce the number of content items subsequently included in the feed. Similarly, as the frequency of content items matched to the topic associated with the feed decreases, the newsfeed generation system 150 may decrease the threshold measure of affinity to increase the number of content items subsequently included in the feed.

Figure 10:
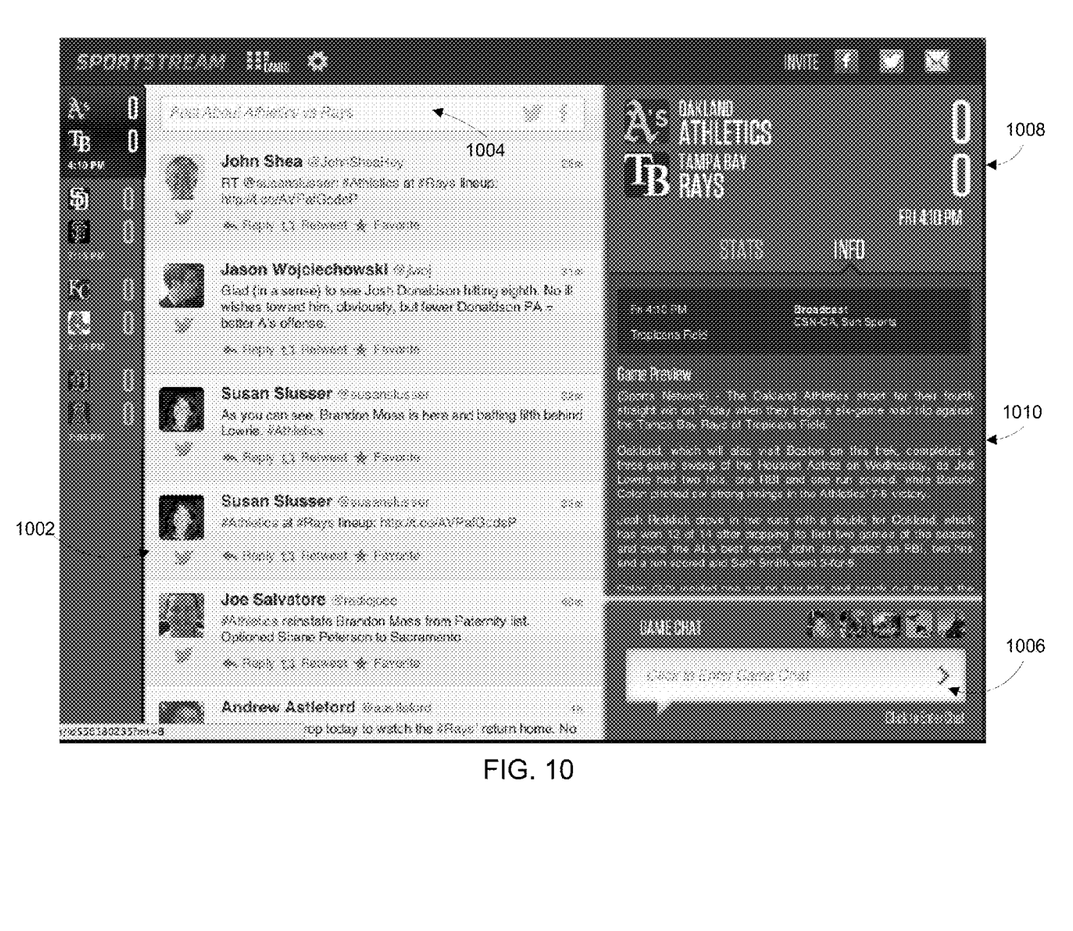
FIG. 10 is an example of a feed associated with a topic.

FIG. 10 illustrates an example user interface including a feed associated with a topic generated by the newsfeed generation system 150. The feed shown in FIG. 10 includes a number of content items 1002 matched to a baseball game between the Oakland Athletics and the Tampa Bay Rays. As content items are received by the newsfeed generation system 150 from various content sources 110 that have at least a threshold measure of affinity for an object associated with the baseball game, the newsfeed generation system 150 includes the content items in the feed associated with the baseball game. The user interface shown in the example of FIG. 10 allows users to interact with the feed by generating a content item for communication to a content source 110 via an input element 1004, by sharing a content item included in the feed with an additional user, or communicating messages to additional users receiving the feed via a messaging interface 1006. The user interface may include further information related to the feed's topic, such as a score 1008 of the game and official commentary 1010 on the game in the example of FIG. 10.

Although embodiments of the newsfeed generation system 150 have been described herein with respect to a sports ontology, the newsfeed generation system 150 may generate topical feeds related to any suitable topic. For example, ontologies may be defined for current events, television shows, musicians and concerts, political campaigns, or any of a wide variety of other domains. The newsfeed generation system 150 matches content items to objects in these ontologies to generate topical feeds using methods similar to those described above.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
storing a plurality of objects in a database of an online system, each object associated with at least one topic;
receiving content items from one or more content sources, the content items each including text;
for each received content item:
comparing the text in the content item to one or more grammatical templates, each grammatical template defining a grammatical relationship between at least one object and a specified word, phrase, or other object, wherein each grammatical template is associated with at least one of a respective ontology or a particular entity within the respective ontology;
identifying, based on the comparison, one or more topics associated with objects associated with the one or more grammatical templates;
determining measures of affinity between the content item and each of one or more objects associated with the identified one or more topics based on one or more match keys and one or more negative match keys, each match comprising a term or phrase that can identify the object and each negative match key comprising a term or phrase that does not identify the object; and
associating the content item with at least one object stored by the online system based at least in part on the measure of affinity between the content item and the at least one object; and
generating a feed for a topic, the feed including content items received from one or more of the content sources and associated with one or more objects stored by the online system associated with the topic.

2. The method of claim 1, further comprising:
extracting terms from the text of a received content item;
wherein determining a measure of affinity between the received content item and each of the one or more objects is based at least in part on a comparison of the extracted terms and the terms or phrases of the one or more match keys, and on a comparison of the extracted terms and the terms or phrases of the one or more negative match keys.

3. The method of claim 1, further comprising:
identifying an author associated with a received content item;
wherein determining a measure of affinity between a received content item and each of the one or more objects further comprises determining a measure of affinity between the author associated with the received content item and the one or more objects in the database associated with the topic.

4. The method of claim 1, wherein the topic is an event associated with the one or more objects in the database, and wherein determining a measure of affinity between a received content item and each of the one or more objects further comprises:
determining a measure of affinity between the received content item and one or more objects in the database that are associated with the topic based at least in part on times associated with each of the received content items and a time associated with the event.

5. The method of claim 1, wherein generating the feed for the topic associated with the one or more objects stored by the online system comprises:
identifying one or more objects in the database that are associated with the topic based on an ontology associated with the topic, the ontology defining relationships between the plurality of objects in the database; and
selecting, for inclusion in the feed for the topic, content items that are associated with at least one object in the database included in the ontology associated with the topic.

6. The method of claim 1, wherein generating the feed for the topic associated with the one or more objects stored by the online system comprises:
selecting, for inclusion in the feed for the topic, content items having at least a threshold measure of affinity for one or more objects stored by the online system and associated with the topic.

7. The method of claim 6, wherein the threshold measure of affinity is based at least in part on a number of content items associated with at least one object associated with the topic.

8. The method of claim 6, wherein the threshold measure of affinity is received from a user.

9. The method of claim 1, wherein generating the feed for the topic associated with the one or more objects stored by the online system comprises:
receiving a request identifying the topic; and
generating the feed for the topic in response to receiving the request.

10. The method of claim 1, wherein affinities associated with one or more of the match keys or negative match keys can be manually adjusted by a user of the online system.

11. The method of claim 1, wherein one or more of the grammatical templates are learned by the online system over time based on text of content items received by the online system.

12. A computer program product comprising a non-transitory computer readable storage medium having instructions encoded thereon that, when executed by a processor, cause the processor to:
store a plurality of objects in a database of an online system, each object associated with at least one topic;
receive content items from one or more content sources, the content items each including text;
for each received content item:
compare the text in the content item to one or more grammatical templates, each grammatical template defining a grammatical relationship between at least one object and a specified word, phrase, or other object, wherein each grammatical template is associated with at least one of a respective ontology or a particular entity within the respective ontology;
identify, based on the comparison, one or more topics associated with objects associated with the one or more grammatical templates;
determine measures of affinity between the content item and each of one or more objects, stored by the online system, associated with the identified one or more topics based on one or more match keys and one or more negative match keys, each match comprising a term or phrase that can identify the object and each negative match key comprising a term or phrase that does not identify the object; and
associate the content item with at least one object stored by the online system based at least in part on the measure of affinity of the content item for the at least one object; and
generate a feed for a topic, the feed including content items received from one or more of the content sources and associated with one or more objects stored by the online system associated with the topic.

13. The computer program product of claim 12 wherein the instructions further comprise instructions that when executed by the processor cause the processor to:
- extract terms from the text of a received content item;
- wherein determining a measure of affinity between the received content item and each of the one or more objects is based at least in part on a comparison of the extracted terms and the terms or phrases of the one or more match keys, and on a comparison of the extracted terms and the terms or phrases of the of the one or more negative match keys.

14. The computer program product of claim 12 wherein the instructions further comprise instructions that when executed by the processor cause the processor to:
- identify an author associated with a received content item;
- wherein determining a measure of affinity between a received content item and each of the one or more objects further comprises determining a measure of affinity between the author associated with the received content item and the one or more objects in the database associated with the topic.

15. The computer program product of claim 12, wherein the topic is an event associated with the one or more objects in the database, and wherein determining a measure of affinity between a received content item and each of the one or more objects further comprises:
- determining a measure of affinity between the received content item and one or more objects in the database that are associated with the topic based at least in part on times associated with each of the received content items and a time associated with the event.

16. The computer program product of claim 12, wherein generate the feed for the topic associated with the one or more objects stored by the online system comprises:
- identifying one or more objects in the database that are associated with the topic based on an ontology associated with the topic, the ontology defining relationships between the plurality of objects in the database; and
- selecting, for inclusion in the feed for the topic, content items that are associated with at least one object in the database included in the ontology associated with the topic.

17. The computer program product of claim 12, wherein generate the feed for the topic associated with the one or more objects stored by the online system comprises:
- select, for inclusion in the feed for the topic, content items having at least a threshold measure of affinity for one or more objects stored by the online system and associated with the topic.

18. The computer program product of claim 17, wherein the threshold measure of affinity is based at least in part on a number of content items associated with at least one object associated with the topic.

19. The computer program product of claim 17, wherein the threshold measure of affinity is received from a user.

20. The computer program product of claim 12, wherein generate the feed for the topic associated with the one or more objects stored by the online system comprises:
- receiving a request identifying the topic; and
- generating the feed for the topic in response to receiving the request.

\* \* \* \* \*